United States Patent
Singh et al.

(10) Patent No.: US 12,232,444 B2
(45) Date of Patent: Feb. 25, 2025

(54) CLEANING FAN AIRFLOW CONTROL SYSTEM

(71) Applicant: Deere & Company, Moline, IL (US)

(72) Inventors: Rana Shakti Singh, Ramgarh (IN); Mehul Bhavsar, Pune (IN); Santosh Khadasare, Pune (IN); Abhishek Kumar Roy, Krishnagar (IN)

(73) Assignee: Deere & Company, Moline, IL (US)

( * ) Notice: Subject to any disclaimer, the term of this patent is extended or adjusted under 35 U.S.C. 154(b) by 782 days.

(21) Appl. No.: 17/395,635

(22) Filed: Aug. 6, 2021

(65) Prior Publication Data

US 2023/0039498 A1    Feb. 9, 2023

(51) Int. Cl.
*A01D 41/127*    (2006.01)
*A01F 12/44*    (2006.01)
*A01F 12/48*    (2006.01)

(52) U.S. Cl.
CPC ..... *A01D 41/1276* (2013.01); *A01D 41/1273* (2013.01); *A01D 41/1277* (2013.01); *A01F 12/444* (2013.01); *A01F 12/48* (2013.01); *A01F 12/446* (2013.01)

(58) Field of Classification Search
CPC ............ A01D 41/1276; A01D 41/1273; A01D 41/1277; A01F 12/444; A01F 12/48; A01F 12/446
See application file for complete search history.

(56) References Cited

U.S. PATENT DOCUMENTS

| | | | | |
|---|---|---|---|---|
| 875,550 | A * | 12/1907 | McCorkell | A01F 12/30 460/85 |
| 1,050,540 | A * | 1/1913 | Hohman | F04D 29/462 460/99 |
| 1,584,790 | A * | 5/1926 | Miller | A01F 12/444 415/149.1 |
| 1,884,114 | A * | 10/1932 | Moroney | A01F 12/444 209/318 |
| 2,324,754 | A * | 7/1943 | Barber | A01F 12/444 209/363 |
| 2,682,951 | A * | 7/1954 | Hamburg | A01F 12/444 209/261 |
| 2,849,118 | A * | 8/1958 | Ashton | A01F 12/444 209/318 |
| 3,258,195 | A * | 6/1966 | Laing | F04D 17/04 415/53.3 |
| 3,664,349 | A * | 5/1972 | Quick | A01F 12/444 415/121.2 |
| 4,017,206 | A * | 4/1977 | Doge | A01F 12/444 415/102 |

(Continued)

FOREIGN PATENT DOCUMENTS

BR    202015028228 U2    6/2016
CN    206993774 A    2/2018
(Continued)

*Primary Examiner* — Arpad Fabian-Kovacs
(74) *Attorney, Agent, or Firm* — Christopher J. Volkmann; Kelly, Holt & Christenson, PLLC

(57) ABSTRACT

A cleaning fan on an agricultural harvester generates airflow along an airflow path through a fan duct. A movable flap is mounted relative to the fan duct and controlled to divert the airflow path in a side-to-side transverse direction relative to a front-to-back longitudinal axis of the agricultural harvester.

13 Claims, 13 Drawing Sheets

(56) References Cited

U.S. PATENT DOCUMENTS

| | | | |
|---|---|---|---|
| 4,259,829 A | 4/1981 | Strubbe | |
| 4,265,077 A * | 5/1981 | Peters | A01F 12/444 460/98 |
| 4,303,079 A * | 12/1981 | Claas | A01F 12/444 56/16.5 |
| 4,307,732 A | 12/1981 | De Busscher | |
| 5,387,154 A * | 2/1995 | Peters | A01F 12/444 460/99 |
| 5,403,235 A | 4/1995 | Baumgarten et al. | |
| 5,558,576 A * | 9/1996 | Meyers | A01F 12/444 460/99 |
| 8,608,534 B1 * | 12/2013 | Stahl | A01F 12/444 460/99 |
| 9,119,350 B2 | 9/2015 | Stan et al. | |
| 10,694,678 B2 * | 6/2020 | Wold | F04D 29/4213 |
| 11,272,668 B2 * | 3/2022 | Duquesne | A01F 12/444 |
| 2002/0037758 A1 * | 3/2002 | Visagie | A01F 12/444 460/99 |
| 2006/0287018 A1 * | 12/2006 | Weichholdt | A01F 12/444 460/99 |
| 2010/0124482 A1 * | 5/2010 | Ricketts | A01F 12/444 415/53.1 |
| 2012/0184339 A1 * | 7/2012 | Schulz | A01D 75/282 460/78 |
| 2014/0162737 A1 * | 6/2014 | Stan | A01F 12/44 460/1 |
| 2015/0334922 A1 * | 11/2015 | Kinder | A01F 12/444 460/149 |
| 2019/0034305 A1 | 1/2019 | Perumal et al. | |
| 2019/0104687 A1 * | 4/2019 | Thomas | A01F 12/444 |
| 2019/0343051 A1 | 11/2019 | Ricketts et al. | |
| 2020/0084971 A1 | 3/2020 | Duquesne et al. | |

FOREIGN PATENT DOCUMENTS

| | | | | |
|---|---|---|---|---|
| DE | 19501828 A1 * | 7/1996 | | A01F 12/444 |
| DE | 102015208892 A1 | 11/2016 | | |
| DE | 102016103234 A1 * | 8/2017 | | A01F 12/444 |
| EP | 3210461 B1 | 8/2017 | | |
| GB | 2224423 A | 5/1990 | | |
| GB | 2293080 A * | 3/1996 | | A01F 12/444 |
| GB | 2472639 A * | 2/2011 | | A01F 12/444 |
| WO | WO-2021077180 A1 * | 4/2021 | | A01D 41/1217 |

* cited by examiner

CLEANING FAN AIRFLOW CONTROL SYSTEM

FIELD OF THE DESCRIPTION

The present description relates to agricultural machines. More specifically, the present description relates to controlling airflow in an agricultural harvester.

BACKGROUND

There are a wide variety of different types of agricultural machines. Some agricultural machines include harvesters, such as combine harvesters.

A cleaning fan blows air through a grain cleaning subsystem in a combine harvester to clean the grain of various types of material other than grain. The cleaning fan in some current systems distributes the airflow uniformly across the cleaning subsystem.

The discussion above is merely provided for general background information and is not intended to be used as an aid in determining the scope of the claimed subject matter.

SUMMARY

A cleaning fan on an agricultural harvester generates airflow along an airflow path through a fan duct. A movable flap is mounted relative to the fan duct and controlled to divert the airflow path in a side-to-side transverse direction relative to a front-to-back longitudinal axis of the agricultural harvester.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

Example 1 is a cleaning subsystem of an agricultural harvester, the cleaning subsystem may include a sieve that separates material other than grain from grain in the agricultural harvester; a cleaning fan that generates air flow through an air duct, the air duct having an upper surface and a lower surface, the air duct defining an airflow path; a flap mounted to extend along a majority of a distance between the upper surface of the air duct and the lower surface of the air duct and being movable to redirect the airflow path in a side-to-side transverse direction relative to an elongate axis of the agricultural harvester; and an actuator coupled to the flap to move the flap.

Example 2 is the cleaning subsystem of any or all previous examples and may further include a crop distribution profile detector configured to determine a crop distribution across the sieve and generate a crop distribution signal indicative of the crop distribution.

Example 3 is the cleaning subsystem of any or all previous examples and may further include a control signal generator configured to generate an actuator control signal to control the actuator based on the crop distribution.

Example 4 is the cleaning subsystem of any or all previous examples wherein the flap is rotatable about an axis of rotation and wherein the actuator is configured to control rotation of the flap about the axis of rotation.

Example 5 is the cleaning subsystem of any or all previous examples and may further include
a flap angle processing system configured to receive the crop distribution signal and generate a target flap angle indicative of a target flap position of the flap about the axis of rotation based on the crop distribution signal, the control signal generator being configured to generate the actuator control signal to control the actuator to move the flap to the target flap position indicated by the target flap angle based on the crop distribution signal.

Example 6 is the cleaning subsystem of any or all previous examples and may further include
a grain loss sensor configured to detect a variable indicative of grain loss in the cleaning subsystem and generate a grain loss sensor signal indicative of the detected grain loss, the control signal generator being configured to generate the actuator control signal based on the grain loss sensor signal.

Example 7 is the cleaning subsystem of any or all previous examples and may further include
a grain quality sensor configured to detect a variable indicative of grain quality and generate a grain quality sensor signal indicative of the variable, the control signal generator being configured to generate the actuator control signal based on the grain quality sensor signal.

Example 8 is the cleaning subsystem of any or all previous examples wherein the flap may include a plurality of flaps mounted to extend along the majority of the distance between the upper surface of the air duct and the lower surface of the air duct and being movable to redirect the airflow path in the side-to-side transverse direction relative to the elongate axis of the agricultural harvester.

Example 9 is the cleaning subsystem of any or all previous examples wherein the actuator may include
a plurality of actuators, each of the plurality of actuators controlling movement of one of the plurality of flaps.

Example 10 is the cleaning subsystem of any or all previous examples wherein the flap angle processing system is configured to generate a different flap target angle corresponding to each of the different flaps in the plurality of flaps and wherein the control signal generator generates actuator control signals to control the different actuators based on the plurality of different flap target angles.

Example 11 is the cleaning subsystem of any or all previous examples wherein the air duct comprises an upper air duct having an upper surface and a lower surface and a lower air duct having an upper surface and a lower surface wherein the flap may include
a first flap mounted to extend along a majority of a distance between the upper surface of the upper air duct and the lower surface of the upper air duct and being movable to redirect an airflow path of air from the upper air duct in a side-to-side transverse direction relative to an elongate axis of the agricultural harvester; and
a second flap mounted to extend along a majority of a distance between the upper surface of the lower air duct and the lower surface of the lower air duct and being movable to redirect an airflow path of air from the lower air duct in a side-to-side transverse direction relative to an elongate axis of the agricultural harvester.

Example 12 is a computer implemented method of controlling an agricultural harvester, the method may include
determining a crop distribution across a portion of a cleaning subsystem;
generating a crop distribution signal indicative of the crop distribution;

generating air flow with a cleaning fan that generates the air flow through an air duct, the air duct having an upper surface and a lower surface, the air duct defining an airflow path; and controlling a position of a flap mounted to extend along a majority of a distance between the upper surface of the air duct and the lower surface of the air duct, the flap being movable to redirect the airflow path in a side-to-side transverse direction relative to an elongate axis of the agricultural harvester based on the crop distribution.

Example 13 is the computer implemented method of any or all previous examples wherein controlling a position of a flap may include generating an actuator control signal to control an actuator coupled to the flap to move the flap based on the crop distribution signal.

Example 14 is the computer implemented method of any or all previous examples wherein the flap is rotatable about an axis of rotation and wherein generating an actuator control signal may include generating the actuator control signal to control the actuator to control rotation of the flap about the axis of rotation.

Example 15 is the computer implemented method of any or all previous examples and may further include generating a target flap angle indicative of a target flap position of the flap about the axis of rotation based on the crop distribution signal, wherein generating the actuator control signal comprises generating the actuator control signal to control the actuator to move the flap to the target flap position indicated by the target flap angle based on the crop distribution signal.

Example 16 is the computer implemented method of any or all previous examples and may further include detecting a grain loss variable indicative of grain loss in the cleaning subsystem;

generating a grain loss sensor signal indicative of the grain loss variable;

detecting a grain quality variable indicative of grain quality; and generating a grain quality sensor signal indicative of the grain quality variable, and wherein generating the actuator control signal comprises generating the actuator control signal based on the grain loss sensor signal and the grain quality sensor signal.

Example 17 is the computer implemented method of any or all previous examples wherein the flap comprises a plurality of flaps mounted to extend along the majority of the distance between the upper surface of the air duct and the lower surface of the air duct and being movable to redirect the airflow path in the side-to-side transverse direction relative to the elongate axis of the agricultural harvester, wherein the actuator comprises a plurality of actuators, each of the plurality of actuators controlling movement of one of the plurality of flaps, and wherein generating a target flap angle may include generating a different flap target angle corresponding to each of the different flaps in the plurality of flaps and wherein generating an actuator control signal comprises generating the actuator control signals to control the different actuators based on the plurality of different flap target angles.

Example 18 is the computer implemented method of any or all previous examples wherein the air duct comprises an upper air duct having an upper surface and a lower surface and a lower air duct having an upper surface and a lower surface wherein the flap comprises a first flap mounted to extend along a majority of a distance between the upper surface of the upper air duct and the lower surface of the upper air duct and being movable to redirect an airflow path of air from the upper air duct in a side-to-side transverse direction relative to an elongate axis of the agricultural harvester and a second flap mounted to extend along a majority of a distance between the upper surface of the lower air duct and the lower surface of the lower air duct and being movable to redirect an airflow path of air from the lower air duct in a side-to-side transverse direction relative to an elongate axis of the agricultural harvester and wherein controlling a position of a flap may include controlling a position of the first flap and controlling a position of the second flap to redirect the airflow path in a side-to-side transverse direction relative to the elongate axis of the agricultural harvester based on the crop distribution.

Example 19 is an agricultural harvester, the agricultural harvester may include a cleaning subsystem including a sieve that separates material other than grain from grain in the agricultural harvester and a cleaning fan that generates air flow through an air duct, the air duct having an upper surface and a lower surface, the air duct defining an airflow path;

a flap mounted to extend along a majority of a distance between the upper surface of the air duct and the lower surface of the air duct and being movable to redirect the airflow path in a side-to-side transverse direction relative to an elongate axis of the agricultural harvester;

a crop distribution profile detector configured to determine a crop distribution across the sieve and generate a crop distribution signal indicative of the crop distribution;

an actuator coupled to the flap to move the flap; and a control signal generator configured to generate an actuator control signal to control the actuator based on the crop distribution.

Example 20 is the agricultural harvester of any or all previous examples wherein the flap is rotatable about an axis of rotation and wherein the actuator is configured to control rotation of the flap about the axis of rotation and may further include a flap angle processing system configured to receive the crop distribution signal and generate a target flap angle indicative of a target flap position of the flap about the axis of rotation based on the crop distribution signal, the control signal generator being configured to generate the actuator control signal to control the actuator to move the flap to the target flap position indicated by the target flap angle based on the crop distribution signal.

DETAILED DESCRIPTION

Figure 1:
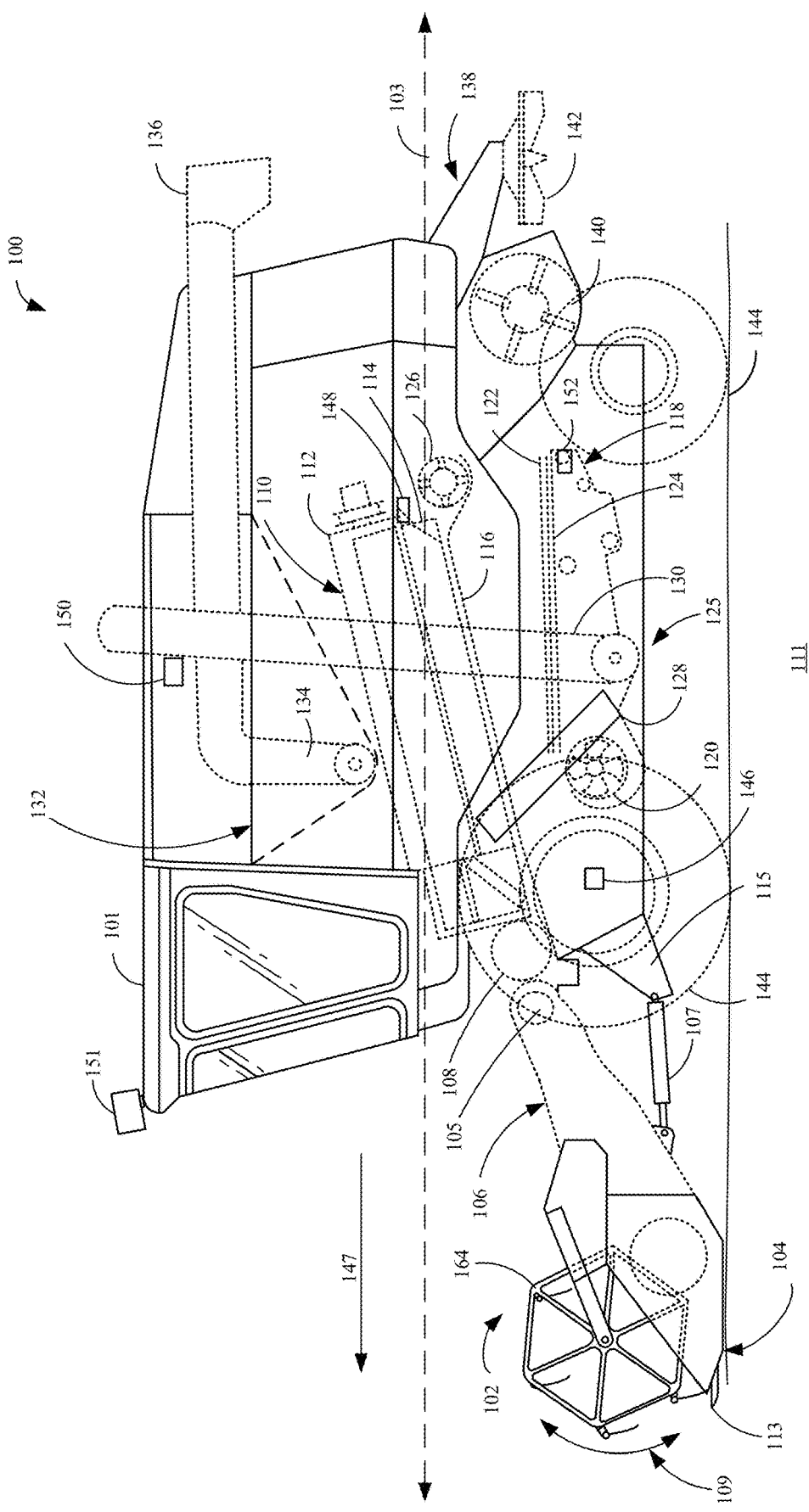
FIG. 1 is a partial pictorial, partial schematic illustration of one example of an agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

FIG. 1 is a partial pictorial, partial schematic illustration of a self-propelled agricultural harvester 100. As shown in FIG. 1, agricultural harvester 100 illustratively includes an operator compartment 101, which can have a variety of different operator interface mechanisms, for controlling agricultural harvester 100. Agricultural harvester 100 has a front-to-back elongate axis 103 defined by a center of agricultural harvester 100. Agricultural harvester 100 includes front-end equipment, such as a header 102, and a cutter generally indicated at 104. The header 102 includes a reel 164. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 115 of agricultural harvester 100 along pivot axis 105. One or more actuators 107 move the header 102 about axis 105 in the direction generally indicated by arrow 109. Thus, a vertical position of header 102 above ground 111 over which the header 102 travels (referred to as the header height) is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis 103 of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that includes chopper 140 and spreader 142. Agricultural harvester 100 also includes a propulsion subsystem that includes an engine that drives ground engaging components 144, such as wheels or tracks. In some examples, a combine harvester within the scope of the present disclosure may have additional or fewer subsystems than those mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, described in more detail below, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. In some implementations, each of the height, roll, and tilt settings are implemented independently of the others. The control system responds to header error (e.g., the difference between the height setting and measured height of header 104 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138. In some examples, the crop is not uniformly distributed across chaffer 122 and sieve 124 in the side-to-side transverse direction, relative to the elongate axis 103. Therefore, in one example, as described below, cleaning fan 120 has flaps that are controlled to change the airflow exiting cleaning fan 120 in the side-to-side transverse direction to preferentially direct air to the areas of sieve 124 that have increased grain deposition than areas of sieve 124 that have reduced grain deposition. Thus, in one example, cleaning fan 120 has flaps that are controlled to change the airflow exiting cleaning fan 120 laterally, that is, from a left side of the agricultural harvester to a right side of the agricultural harvester or from a right side of the agricultural harvester 100 to a left side of the agricultural harvester 100, or both, as opposed to a top side to a bottom side or a bottom side to a top side.

Tailings elevator 128 returns tailings to thresher 110 where the tailings are re-threshed. Alternatively, the tailings also may be passed to a separate re-threshing system by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture sensor 151, which may be in the form of a stereo or mono camera, and one or more loss sensors 152 provided in the cleaning subsystem 118.

Ground speed sensor 146 senses the travel speed of agricultural harvester 100 over the ground. In some instances, ground speed sensor 146 senses the travel speed of the agricultural harvester 100 by sensing the speed of rotation of the ground engaging components (such as wheels or tracks), a drive shaft, an axel, or other components. In some instances, the travel speed is sensed using a positioning system, such as a global positioning system (GPS), a dead reckoning system, a long range navigation (LORAN) system, or a wide variety of other systems or sensors that provide an indication of travel speed.

In some implementations, forward looking image capture sensor 151 is a camera and has a corresponding image processing system that can identify the terrain (such as whether the terrain slopes) or crop characteristics or other items ahead of agricultural harvester 100.

Loss sensors 152 illustratively provide an output signal indicative of the quantity of grain loss occurring at locations laterally positioned within the cleaning subsystem 118 (i.e., in both right and left sides of the cleaning subsystem 118). In some examples, sensors 152 are strike sensors that count grain strikes per unit of time or per unit of distance traveled to provide an indication of the grain loss occurring at the cleaning subsystem 118. In some instances, the strike sensors for the right and left sides of the cleaning subsystem 118 provide individual signals. In some instances, the strike sensors for the right and left sides of the cleaning subsystem 118 provide a combined or aggregated signal. In some examples, sensors 152 include a single sensor, as opposed to separate sensors provided for each the right and left sides of the cleaning subsystem 118.

Separator loss sensor 148 provides a signal indicative of grain loss in the left and right separators, not separately shown in FIG. 1. The separator loss sensors 148 may be associated with the left and right separators and, in some instances, provides separate grain loss signals. In other instances, the separate or loss sensor 148 provide a combined or aggregate signal. In some instances, sensing grain loss in the separators is also performed using a wide variety of different types of sensors as well. For example, in some instances, agricultural harvester 100 also includes an image processing system that processes images captured by clean grain camera 150. The image processing system can generate an output indicative of grain quality in terms of how clean the grain is that is entering the clean grain tank.

Agricultural harvester 100 may also include other sensors and measurement systems. For instance, agricultural harvester 100 may include one or more of the following sensors: a header height sensor that senses a height of header 102 above ground 111; stability sensors that sense oscillation or bouncing motion (frequency, amplitude, or both) of agricultural harvester 100; a residue setting sensor that is configured to sense whether agricultural harvester 100 is configured to chop the residue, produce a windrow, etc.; a cleaning shoe fan speed sensor to sense the speed of cleaning fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor, such as a capacitive moisture sensor, that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, crop constituent characteristics, and other crop properties. In some implementations, crop property sensors are also configured to sense characteristics of the severed crop material as the crop material is being processed by agricultural harvester 100. For example, in some instances, the crop property sensors sense grain quality, such as broken grain; MOG levels; grain constituents, such as starches and protein; and grain feed rate as the grain travels through the feeder house 106, clean grain elevator 130, or elsewhere in the agricultural harvester 100. In some instances, the crop property sensors also sense the feed rate of biomass through feeder house 106, through the separator 116, or elsewhere in agricultural harvester 100. In some instances, the crop property sensors sense the feed rate as a mass flow rate of grain through elevator 130 or through other portions of the agricultural harvester 100 or provide other output signals indicative of other sensed variables. Crop property sensors can include one or more crop constituent sensors that sense characteristics indicative of crop constituents of crops, including characteristics of constituents of grains of crops.

Figure 2:
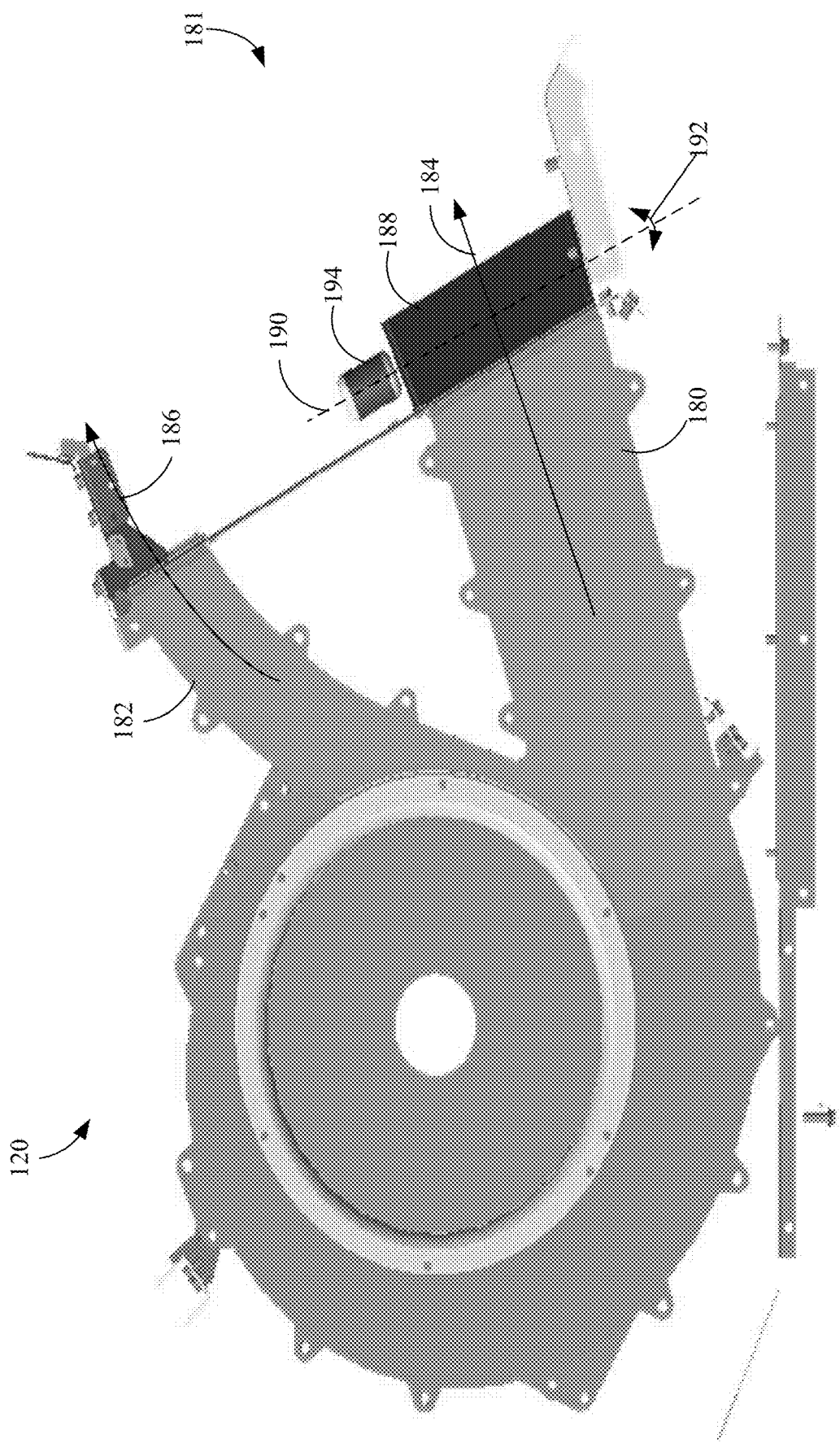
FIG. 2 is a side view of one example of a cleaning fan.

FIG. 2 is a side view showing one example of cleaning fan 120 in more detail. In the example shown in FIG. 2, cleaning fan 120 has a plurality of output air ducts including a lower air duct 180 and an upper air duct 182. Air exits the lower air duct 180 along an airflow path generally in the direction indicated by arrow 184, and air exits the upper air duct 182 along an airflow path generally in the direction indicated by arrow 186. In order to modify the airflow path, cleaning fan 120 has a set of flaps or baffles that are rotatable in the direction into and out of the page of FIG. 2. Because FIG. 2 is a side view, a single flap 188 is illustrated in FIG. 2. Flap 188 is mounted for rotation about an axis of rotation 190 in the direction indicated by arrow 192. Rotation of flap 188 is driven by an actuator 194, which may be an electric actuator or another actuator.

Figure 3:
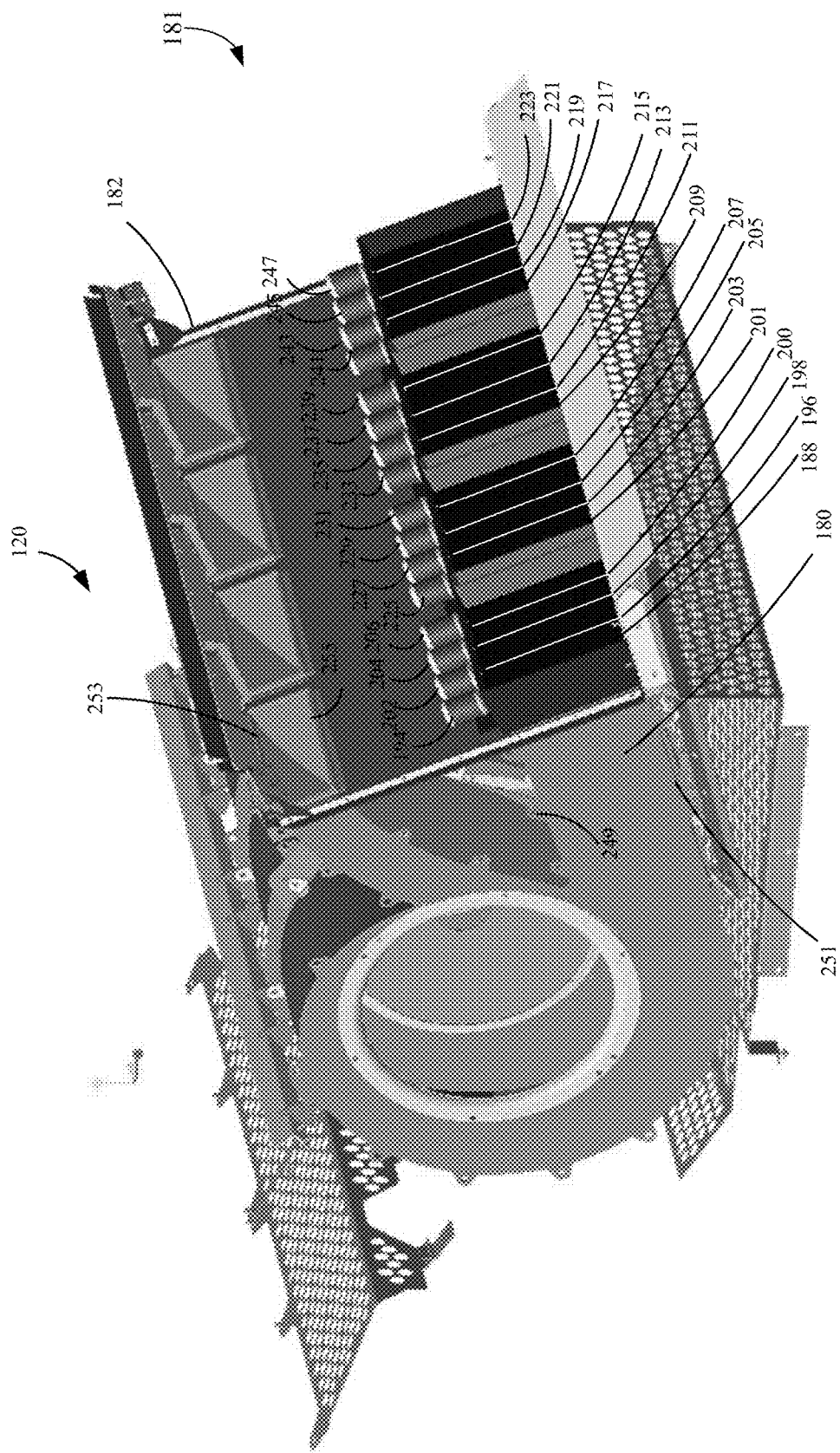
FIG. 3 is an oblique view of one example of a cleaning fan with flaps closed.

FIG. 3 is an oblique view of one example of cleaning fan 120. FIG. 3 shows that cleaning fan 120 has a plurality of flaps arranged across the entire output end 181 of air duct 180. The flaps are numbered 188, 196, 198, 200, 201, 203, 205, 207, 209, 211, 213, 215, 217, 219, 221, and 223. Each of the flaps has a corresponding actuator 194, 202, 204, 206, 225, 227, 229, 231, 233, 235, 237, 239, 241, 243, 245, and 247. Air duct 180 has an upper surface 249 and a lower surface 251. The surfaces 249 and 251 are shown as being generally planar surfaces but could be curved as well. Air duct 182 also has an upper surface 253 and a lower surface 255. The surfaces 253 and 255 are also shown as being generally curved surfaces but could be planar as well.

Figure 4:
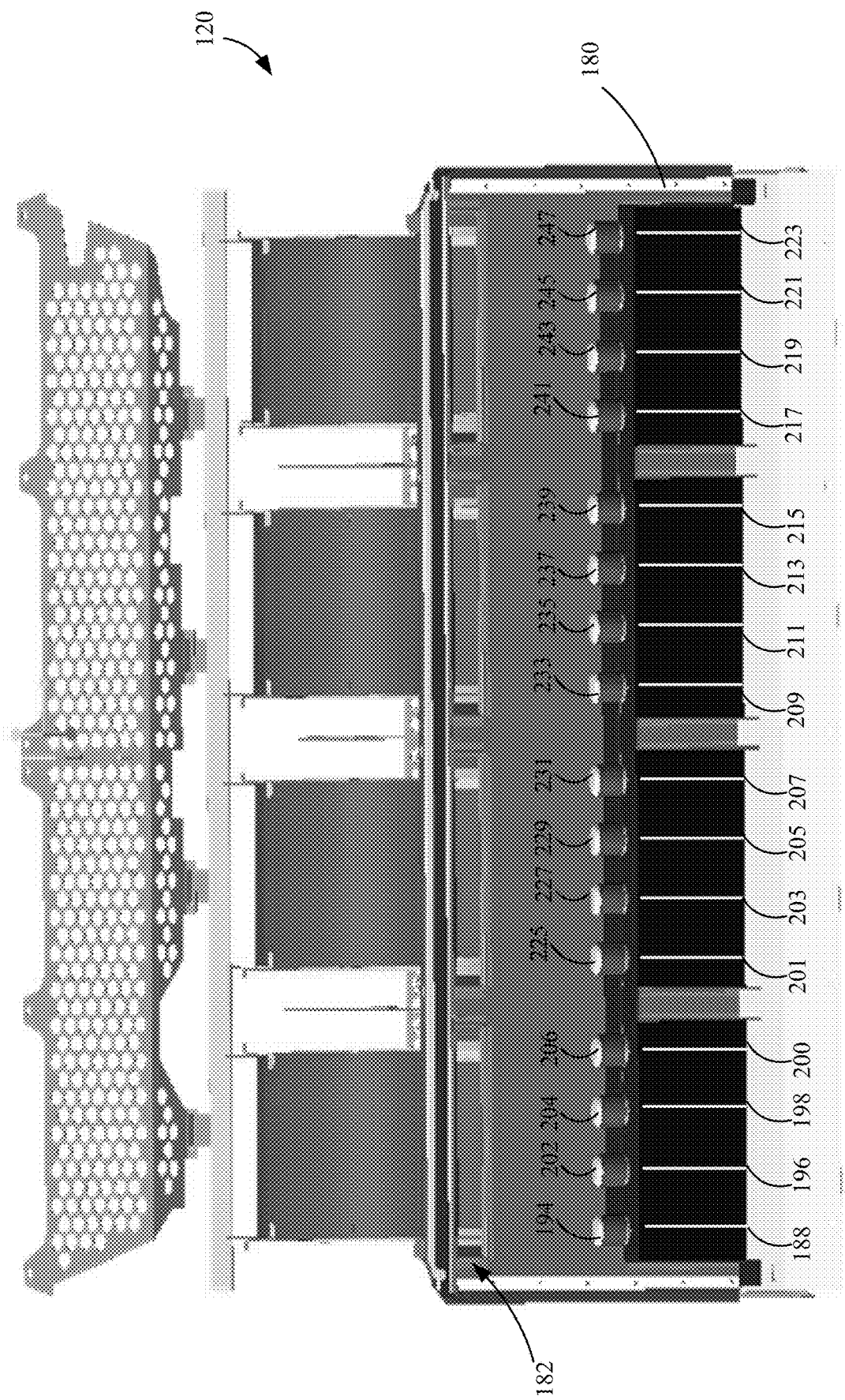
FIG. 4 is a rear view of the cleaning fan showing all flaps fully closed.

FIG. 4 is a rear view of the example of cleaning fan 120 shown in FIG. 3, in which all of the flaps are rotated to the closed position. In the closed portion, the flaps close or impede the airflow path of the air through the lower air duct 180 of fan 120.

Figure 5:
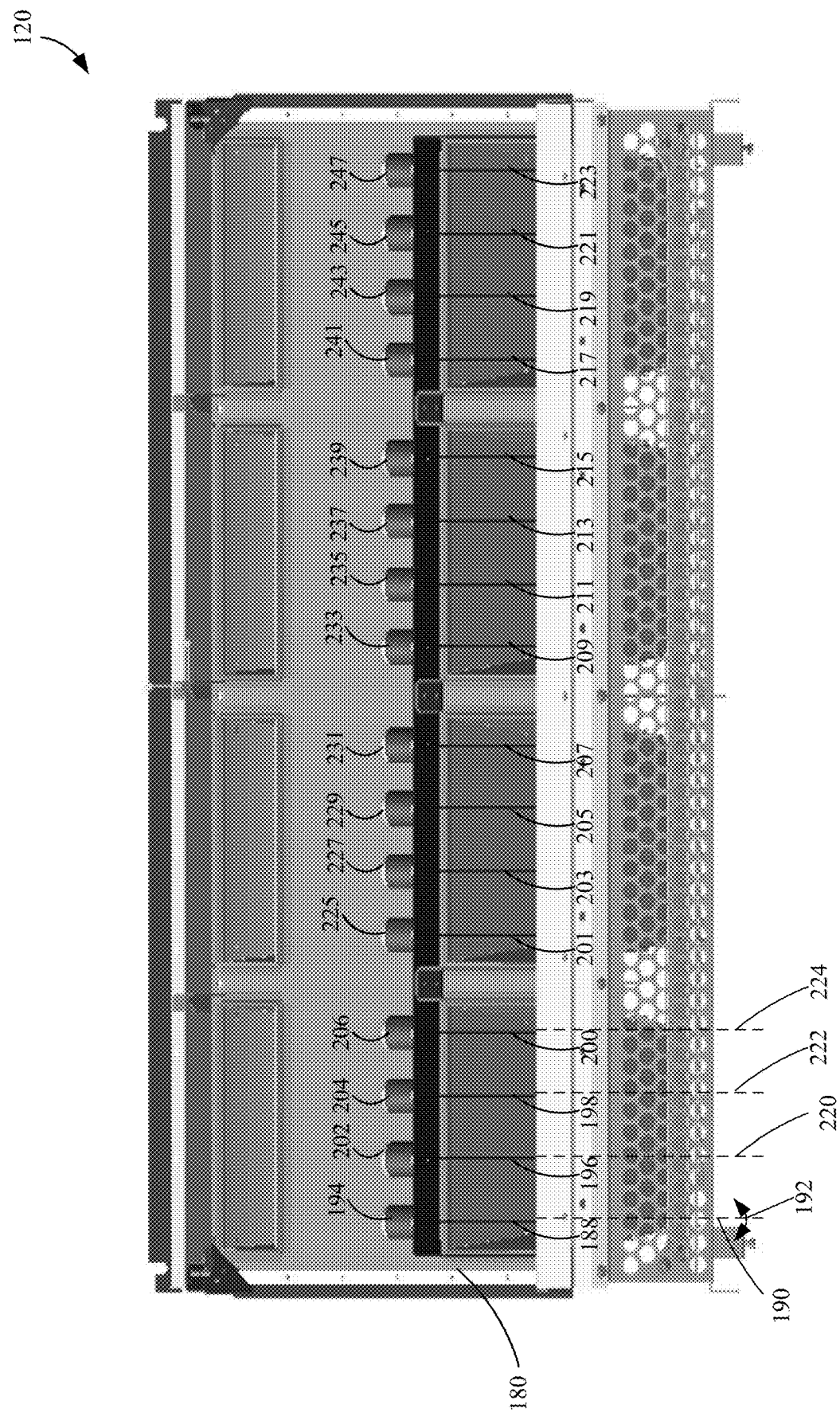
FIG. 5 is a rear view of the cleaning fan with flaps fully opened.

FIG. 5 is a rear view of cleaning fan 120 with all flaps rotated to the fully open position. FIG. 5 shows that each of the flaps 188, 196, 198, and 200 have an axis of rotation, oriented similarly to axis 190 for flap 188. For instance, flap 196 is mounted for rotation about axis 220. Flap 198 is mounted for rotation about axis 222 and flap 200 is mounted for rotation about axis 224. In one example, each of the flaps has an axis of rotation, but the axes of rotation for flaps other than flaps 188, 196, 198, and 200 are omitted. Therefore, each flap can rotate about its corresponding axis of rotation, and the rotation of each flap is driven by the actuator coupled to the flap. The actuators 194, 202, 204, 206, 225, 227, 229, 231, 233, 235, 237, 239, 241, 243, 245, and 247 can be commonly controlled so that the actuators 194, 202, 204, 206, 225, 227, 229, 231, 233, 235, 237, 239, 241, 243, 245, and 247 each drive the corresponding flaps to the same position about the axis of rotation corresponding to each flap. In another example, each of the actuators can be controlled in sets. In another example, the actuators can be controlled independently of one another to independently position the corresponding flaps.

Figure 6:
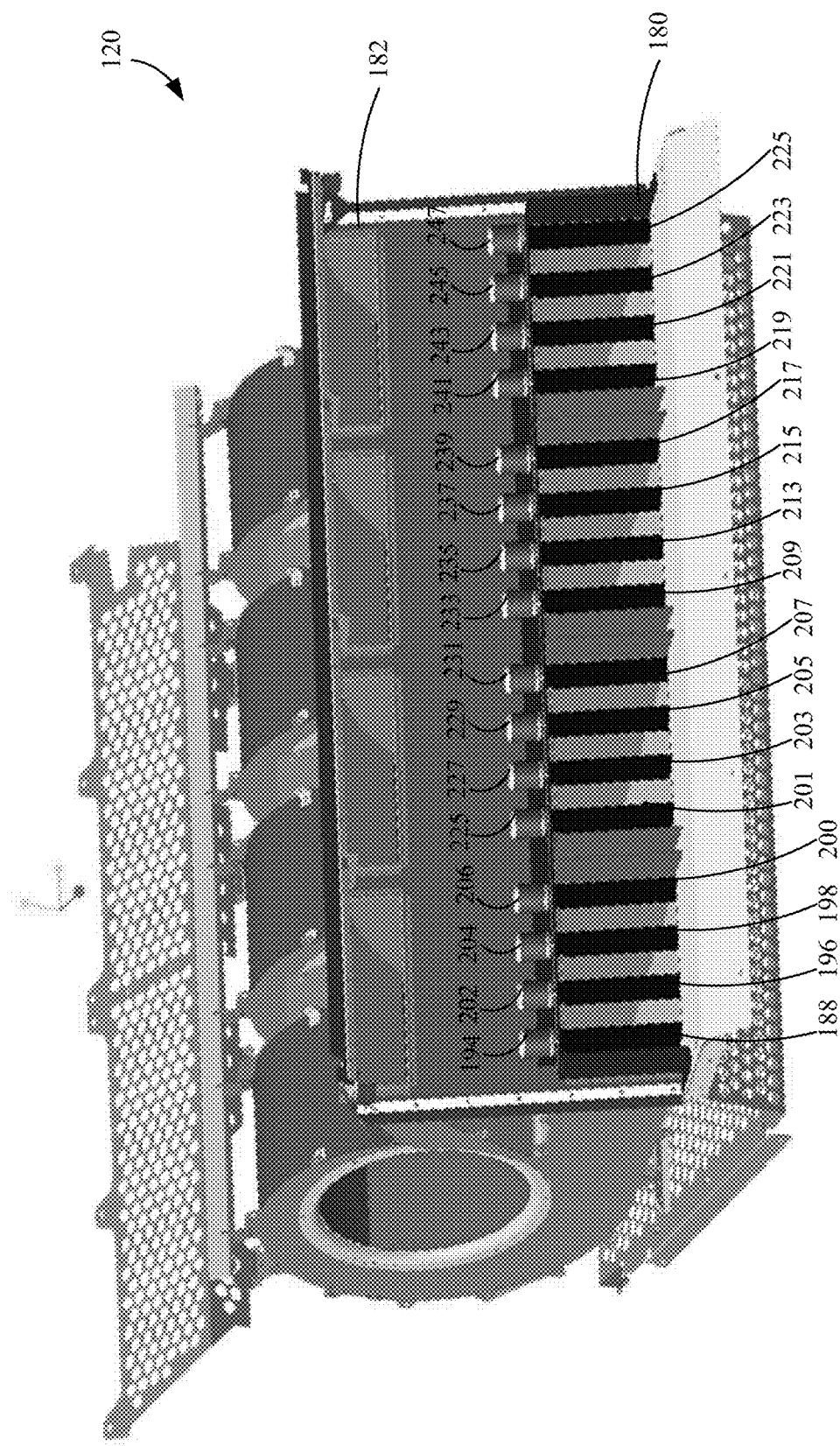
FIG. 6 is an oblique view of the cleaning fan with flaps open.

FIG. 6 is an oblique view of cleaning fan 120 with the flaps in the fully open position, as shown in FIG. 5. Similar items to those shown in FIG. 5 are similarly numbered in FIG. 6.

Figure 7:
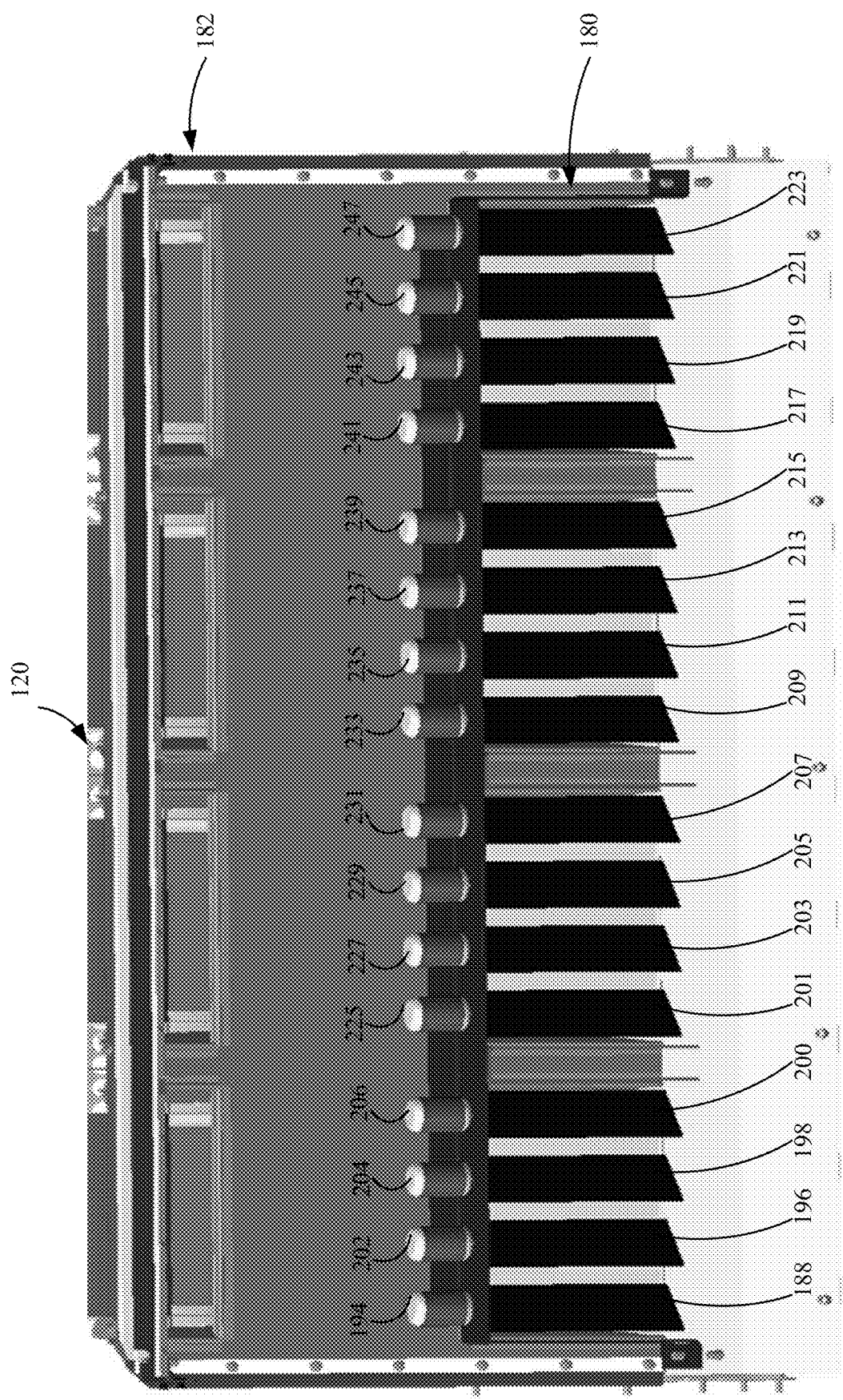
FIG. 7 is a rear view of a cleaning fan with all flaps partially opened.

FIG. 7 is a rear view of cleaning fan 120, similar to that shown in FIG. 5, except that the flaps are in a partially open position in FIG. 7. Thus, the flaps in FIG. 7 redirect airflow from air duct 180 in a side-to-side transverse direction relative to the elongate axis 103 of agricultural harvester 100 (shown in FIG. 1), which is directed into an out of the page of FIG. 7.

Figure 8:
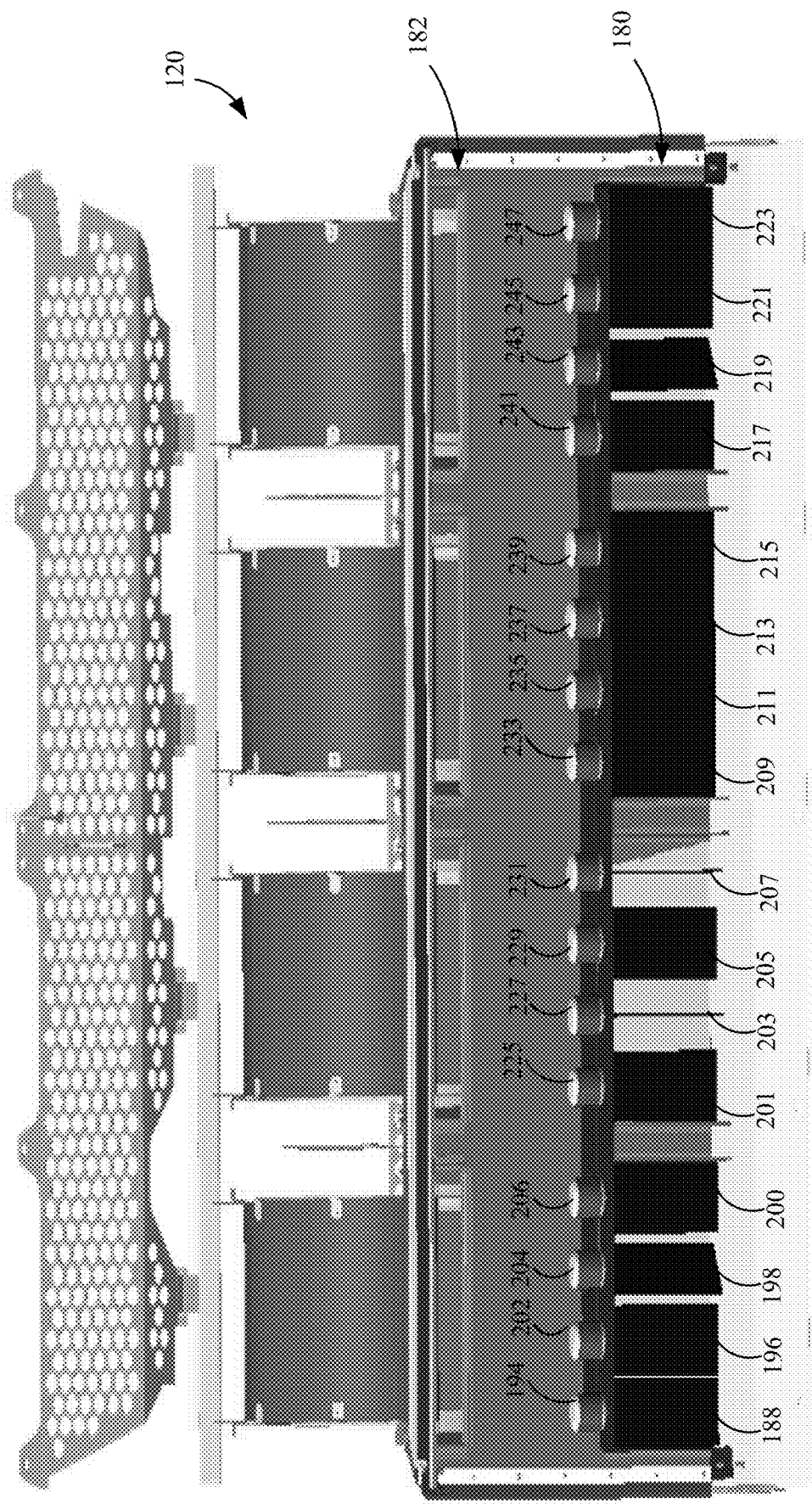
FIG. 8 is a rear view of a cleaning fan showing flaps individually controllable with some flaps closed, some flaps open, and some flaps partially open.

FIG. 8 is a rear view of cleaning fan 120, similar to that shown in FIG. 7, except that FIG. 8 shows that the actuators are independently controllable. Thus, as shown, some of the flaps are fully closed, some of the flaps are fully open, and some of the flaps are only partially open. For instance, FIG. 8 shows that actuators 194, 202, 206, 225, 229, 233, 235, 237, 239, 241, 245, and 247 have been controlled to rotate the corresponding flaps 188, 196, 200, 201, 205, 209, 211, 213, 215, 217, 221, and 223 to the fully closed position. Actuators 204 and 243 have been controlled to rotate corresponding flaps 198 and 219 to the partially open position, and actuators 227 and 231 have been controlled to rotate corresponding flaps 203 and 207 to the fully open position.

Figure 9:
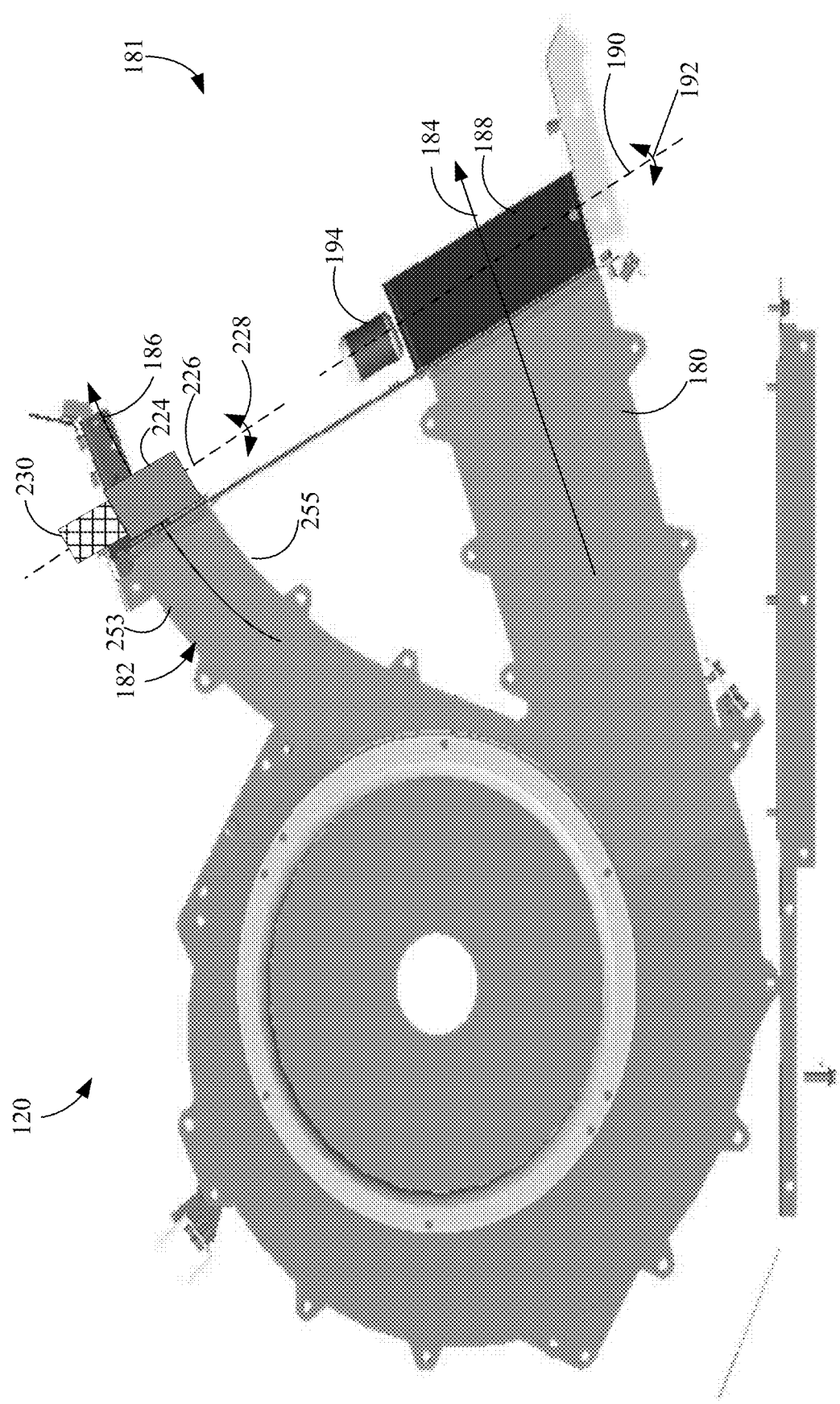
FIG. 9 is a side view of one example of a cleaning fan with flaps mounted to both upper and lower air ducts.

FIG. 9 is a side view of another example of cleaning fan 120 that is similar to that shown in FIG. 2, and similar items are similarly numbered. However, in FIG. 2, the upper air duct 182 also has a set of flaps and associated actuators that can be controlled to control the airflow path. Consequently, the flaps and associated actuators operate to redirect or divert the airflow path in a direction into and out of the page of FIG. 9. The direction into and out of the page of FIG. 9 is also referred to as a side-to-side transverse direction because the direction is transverse to the elongate axis 103 of agricultural harvester 100 in the side-to-side direction. FIG. 9 shows, for example, a flap 224 that is mounted for rotation about an axis of rotation 226 in the direction indicated by arrow 228. An actuator 230 is mounted to flap 224 to controllably rotate flap 224 about axis of rotation 226.

Figure 10:
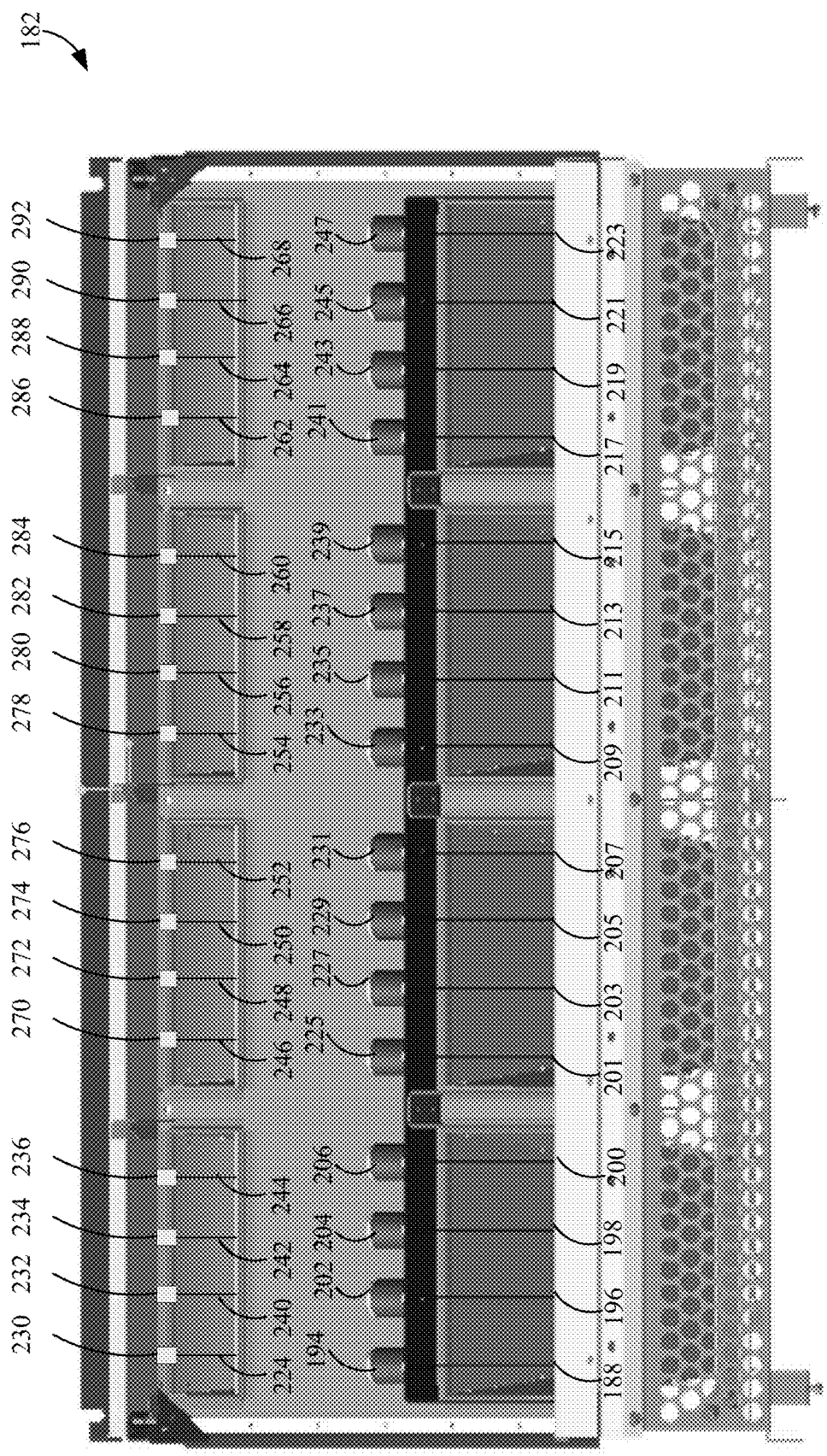
FIG. 10 is a rear view of one example of a cleaning fan showing flaps in both the upper and lower air ducts in fully open position.

FIG. 10 is a rear view of cleaning fan 120, similar to that shown in FIG. 5, and similar items are similarly numbered. However, FIG. 10 shows an example of cleaning fan 120 in which flaps are disposed across the entire output end of air duct 182. Thus, FIG. 10 shows flaps 224, 240, 242, 244, 246, 248, 250, 252, 254, 256, 258, 260, 262, 264, 266, and 268. FIG. 10 also shows that each of the flaps has a corresponding actuator 230, 232, 234, 236, 270, 272, 274, 276, 278, 280, 282, 284, 286, 288, 290, and 292. Each actuator drives rotation of the corresponding flap about an axis of rotation of the flap.

In one example, the actuators are all commonly controlled to drive the corresponding actuators to the same position, and, in another example, the actuators are controlled in sets. For instance, the actuators 194, 202, 204, and 206 can all be commonly controlled as a set. Similarly, the actuators 230-236 can be controlled as a set, as can the actuators 270-276, actuators 278-284, and actuators 286-292. In yet another example, each of the actuators can be independently controllable relative to other actuators so that each of the flaps can be moved to a position from the fully closed position to the fully open position independently of the other flaps.

Figure 11:
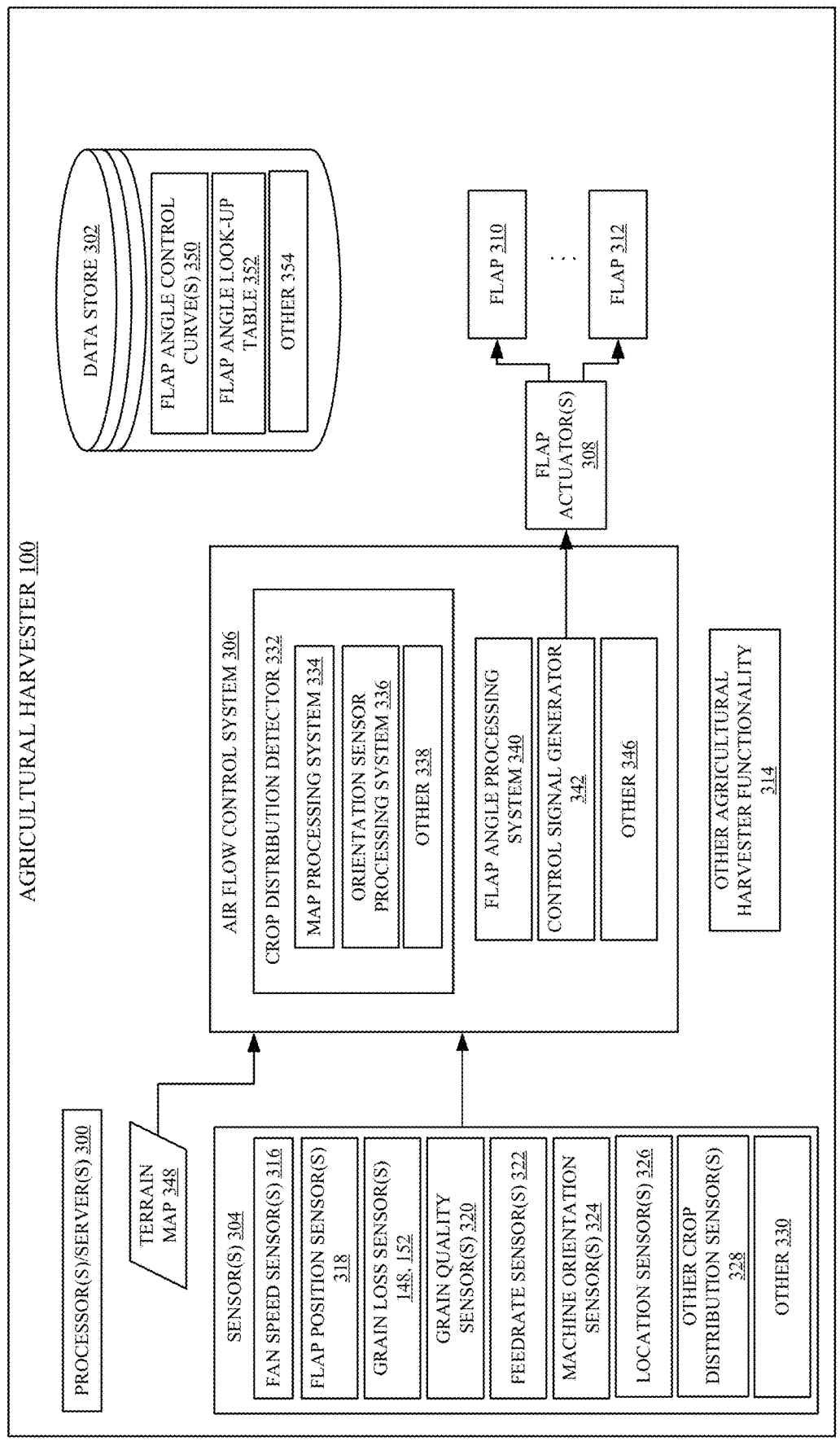
FIG. 11 is a block diagram of one example of a portion of an agricultural harvester.

FIG. 11 is a block diagram showing one example of a portion of agricultural harvester 100 in more detail. In the example shown in FIG. 11, agricultural harvester 100 can include one or more processors or servers 300, data store 302, sensors 304, airflow control system 306, a set of actuators 308 that control corresponding flaps 310-312, and a wide variety of other agricultural harvester functionality 314. Flaps 310-312 may be the flaps shown in the previous figures, and actuators 308 may be the actuators shown in the previous figures. Sensors 304 include a fan speed sensor 316 that senses the speed of cleaning fan 120, and one or more flap position sensors 318 that sense the position of the flaps 310-312 about their corresponding axes of rotation. Flap position sensor(s) 318 can alternatively sense the output position of a drive shaft or other driving element that the flap actuators 308 use to drive rotation of flaps 310-312. The flap position sensor(s) 318 may be Hall Effect sensors, rotary position sensors, potentiometers, or any of a wide variety of other position sensors. Sensors 304 also include grain loss sensors 148, 152; grain quality sensor 320 that senses the quality of grain, such as the grain entering the clean grain tank; feed rate sensor 322 that senses feed rate, as discussed above; machine orientation sensor 324, which may be an accelerometer, a gyroscopic sensor, or another sensor that senses the orientation of agricultural harvester 100; location sensor 326, which may be a GPS receiver or another location sensor; and one or more other crop distribution sensors 328 that, for example, sense the distribution of crop across the cleaning subsystem 118, in the transverse direction (or side-to-side direction relative to elongate axis 103). Sensors 304 can include a wide variety of other sensors 330 as well.

Airflow control system 306 includes crop distribution detector 332, and the crop distribution detector 332 includes one or more of map processing system 334, orientation sensor processing system 336, or other items 338. Airflow control system 306 also includes flap angle processing system 340, control signal generator 342, and other items 346. Crop distribution detector 332 illustratively detects the distribution of crop across the cleaning subsystem 118 in the transverse direction. For instance, crop distribution detector 332 detects or determines the distribution of crop across the sieve 124. In one example, map processing system 334 receives a terrain map 348 that is indicative of the terrain of the field over which agricultural harvester 100 is traveling. Map processing system 334 uses the terrain map 348, in addition to the location sensor and machine orientation sensor 324, to determine the location of agricultural harvester 100 on the terrain map 348 and the heading or direction of travel of agricultural harvester 100. Map processing system 334 determines whether agricultural harvester 100 is on a side slope, is about to travel over a side slope, or has just traveled over a side slope. If agricultural harvester 100 has traveled, is traveling, or is about to travel over a side slope, the orientation of agricultural harvester on the side slope may affect the distribution of crop in the transverse direction in the cleaning subsystem 118.

In another example, orientation sensor processing system 336 receives an orientation sensor signal from machine orientation sensor 324, and, based upon the machine orientation (e.g., whether the machine is oriented on a side slope or otherwise), estimates the grain distribution across the cleaning subsystem 118. Other sensors can be used (such as optical sensors or other sensors) to capture an image of the grain distribution in the cleaning subsystem 118 or otherwise sense the grain distribution in the cleaning subsystem 118 directly. Those other crop distribution sensors 328 can generate signals that can be processed by other crop distribution detectors 338 to determine the crop distribution of crop across the cleaning subsystem 118.

Flap angle processing system 340 receives a signal from flap position sensors 318 indicating the current position of the flaps 310-312. In some instances, flap angle processing system 340 also receives an input from crop distribution detector 332 that is indicative of the distribution of crop across the cleaning subsystem 118. Flap angle processing system 340 generates an output indicative of target flap angles for the flaps 310-312. In some instances, the target flap angles are used to control a position of the flaps 310-312 to direct airflow from cleaning fan 120 to one or more sides or areas of the cleaning subsystem 118 that have an increased crop crop loading than one or more other portions of the cleaning subsystem 118. In some instances, the flap angles of the flaps 310-312 are adjusted to direct airflow from the cleaning fan 120 to one or more areas of the cleaning subsystem 118 that have the greatest crop loading. If the crop is uniformly distributed across the cleaning subsystem 118, then the flaps 310-312 can all be angled to uniformly distribute air from cleaning fan 120 across the cleaning subsystem 118. However, if one or more areas of the cleaning subsystem 118 have a greater crop loading than other areas of the cleaning subsystem 118, then flap angle processing system 340 can generate an output indicative of a target angle for the individual flaps (or subsets of flaps or all the flaps collectively) to preferentially distribute airflow toward those areas of the cleaning subsystem 118 that have the greater crop loading. In some instances, in determining the target flap angles, flap angle processing system 340 accesses one or more flap angle control curves 350 that are stored in data store 302. In some implementations, the flap angle control curves plot the target flap angles based on one or more various inputs, such as crop distribution, the output from grain loss sensors 148, 152, the output from grain quality sensor(s) 320 and feed rate sensor(s) 322, or the output from any of the other sensors 304. Thus, for any given combination of sensor values and a crop distribution, the flap angle control curves 350 provide one or more different target angles for the flaps 310-312.

The target flap angles may also be stored in a flap angle lookup table 352 or in other structures 354. For example, the flap angle lookup table 352 or other structures store target flap angles given various different sets of criteria, such as fan speed, grain loss, machine orientation, grain quality, feed rate, crop distribution, etc. Other models may be used to generate the target flap angles as well.

Control signal generator 342 receives an output from flap angle processing system 340 indicating the target angles for the flaps 310-312 and generates control signals to control flap actuators 308 to control the flaps 310-312 to drive the flaps 310-312 to the target flap angles output by flap angle processing system 340. In some implementations, control signal generator 342 receives an input from flap position sensors 318 to control actuators 308 in a closed loop fashion when driving the flaps 310-312 to a target flap angle.

Figure 12:
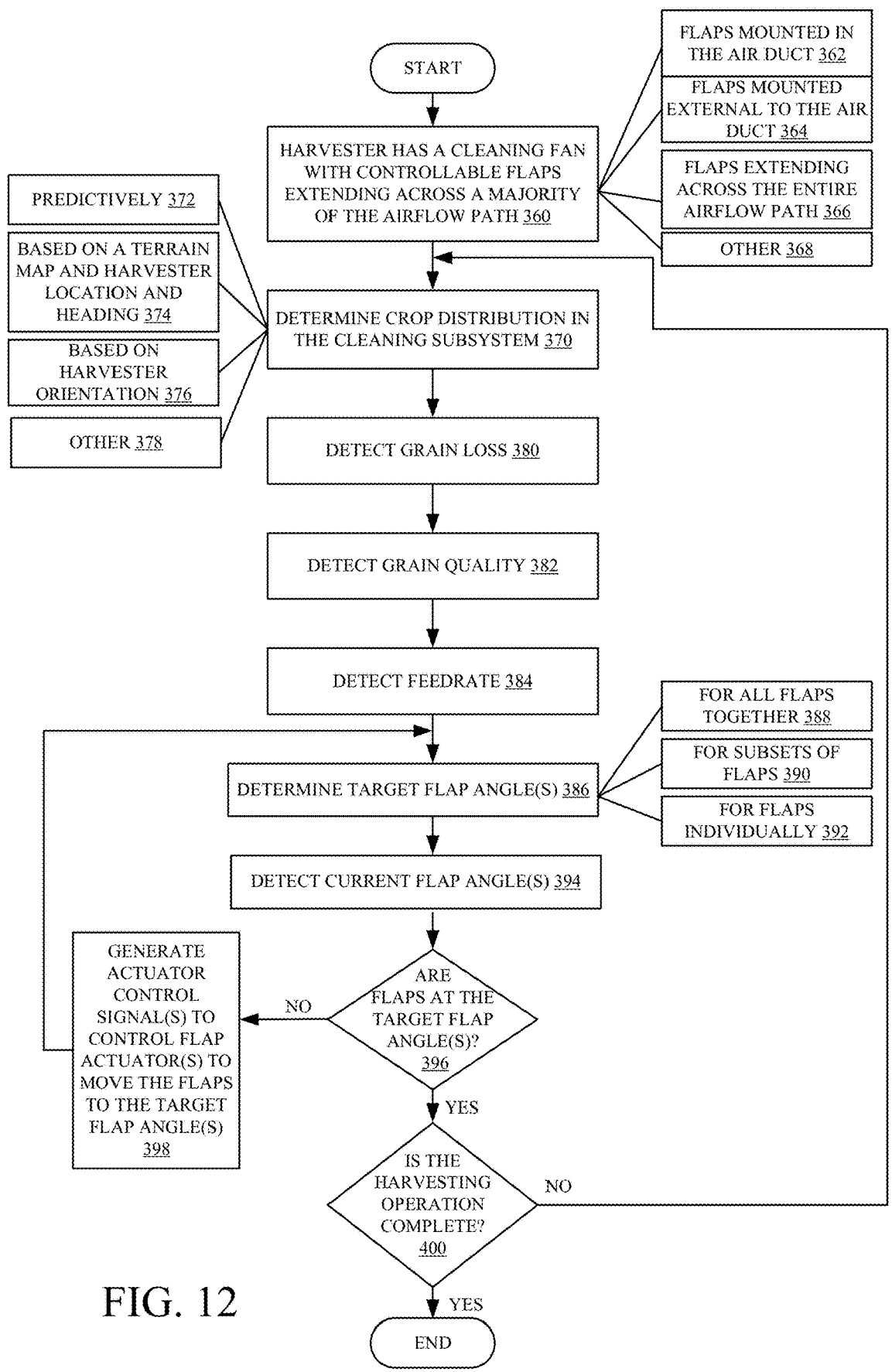
FIG. 12 is a flow diagram illustrating one example of the operation of an agricultural harvester in controlling airflow generated by the cleaning fan.

FIG. 12 is a flow diagram illustrating one example of the operation of agricultural harvester 100 in detecting the crop distribution in the cleaning subsystem 118 and controlling the flap actuators 308 and flaps 310-312 to move the flaps 310-312 to target flap angles based upon the crop distribution to direct airflow from cleaning fan 120 to areas in the cleaning subsystem 118 that have a greater crop loading than areas with less crop loading. Block 360 indicates that harvester 100 has a cleaning fan 120 with controllable baffles or flaps extending across at least a portion of the airflow path from the upper surface of the air duct to the lower surface of the air duct.

It can be seen from FIGS. 2-10 that the flaps extend across at least a majority of the airflow path defined by the air ducts 180 and 182. As an example, the flap 188 extends from the upper surface 249 of air duct 180 to the lower surface 251. Similarly, flap 224 extends from the upper surface 253 of air duct 180 to the lower surface 255. In the example shown in FIGS. 2-10, the flaps extend across an entire height of the opening defined by the air duct and, thus, extend across the entire height of the airflow path. However, in other examples, the flaps may extend less than the entire height of the airflow path (e.g., less than the distance from the upper surface of the air duct to the lower surface of the air duct). In some instances, the flaps extend at least across a majority of the height of the airflow path. It will also be noted that, in the examples shown in FIGS. 2-10, the flaps are mounted at the output of the air ducts 180 and 182. It will be noted that they could just as easily be mounted within the air ducts 180 and 182 as well. Block 362 shows that the flaps are mounted within the air ducts, while block 364 indicates that the flaps can be mounted external to the air ducts. Block 366 shows that the flaps can extend across the entire airflow path, from the top surface of the air duct to the bottom surface of the air duct. The flaps can be mounted in other ways as well, as indicated by block 368.

Crop distribution detector determines the crop distribution in the cleaning subsystem 118, as indicated by block 370. In one example, crop distribution detector 332 estimates the crop distribution across the cleaning subsystem 118 predictively, as indicated by block 372. The predictive estimate predictively estimates the crop distribution in the cleaning subsystem 118 that will occur as agricultural harvester 100 traverses the terrain ahead of agricultural harvester in the field over which agricultural harvester 100 is traveling.

In an example, map processing system 334 processes the terrain map 348 based upon the location of agricultural harvester 100 indicated by the location sensor 326 and based upon the heading of harvester 100 indicated by the machine orientation sensor 324. Map processing system 334 identifies, based on such inputs, whether agricultural harvester 100 is operating on a side slope or whether agricultural harvester 100 has just operated on a slide slope (in which case the grain may have been redistributed across the cleaning subsystem 118) or whether agricultural harvester 100 is about to operate on a side slope. In some instances, map processing system 334 generates an output indicative of the estimated grain distribution across the cleaning subsystem 118 in response to the received input(s). Estimating the crop distribution based upon the terrain map and the harvester location and heading is indicated by block 374 in the flow diagram of FIG. 12.

Orientation sensor processing system 336 also receives an input from machine orientation sensors 324 indicating the orientation of agricultural harvester relative to a gravity vector to determine whether the machine is tilted or operating on a side slope. Block 376 indicates that orientation sensor processing system 336 can estimate the crop distribution across the cleaning subsystem 118 based upon the orientation of agricultural harvester 100. The crop distribution across the cleaning subsystem 118 can be determined in other ways as well, as indicated by block 378.

In another example, airflow control system 306 considers the current grain loss and grain quality in determining whether to divert airflow from cleaning fan 120 in one direction or another. For instance, if excessive grain loss is being detected, then airflow diversion may be more desired than if grain loss is at a reduced level. Similarly, if the grain quality is considered to be at an undesirable level, then diverting the air flow may be more desirable than if grain quality is at a more desirable level. Block 380 in FIG. 12 shows that flap angle processing system 340 detects grain loss from grain loss sensors 148, 152. Block 382 in FIG. 12 shows that flap angle processing system 340 detects grain quality from one or more of the grain quality sensors 320. It may also be helpful to detect biomass feedrate through the cleaning subsystem 118 or elsewhere in agricultural harvester 100 in order to determine whether the direction of the airflow should be changed. Therefore, block 384 shows that flap angle processing system 340 also detects feedrate from one or more feedrate sensors 322.

Flap angle processing system 340 determines one or more target flap angles, as indicated by block 386. In one example, all of the actuators 308 corresponding to flaps 310-312 are controlled together so that flap angle processing system 340 determines only a single target flap angle for controlling the position of all of the flaps together, as indicated by block 388. Block 390 shows that the flap actuators 308 can control flaps 310-312 in subsets, in which case flap angle processing system 340 generates a target flap angle for each independently controlled subset of actuators 308 and corresponding flaps 310-312. In another example, each of the flap actuators 308 may be independently controlled, in which case flap angle processing system 340 identifies a target flap angle for each flap 310-312 so that the actuator 308 corresponding to each flap can be controlled to move the flap to the desired target angle for that flap. Controlling the actuators and flaps individually and independently of one another is indicated by block 392 in the flow diagram of FIG. 12.

Flap angle processing system 340 provides the target flap angles to control signal generator 342. Block 394 indicates that flap position sensors 318 detect the current flap angles. At block 396, control signal generator 342 determines whether the flaps 310-312 are currently at the target flap angles based upon the flap position signal received from flap position sensor 318. If the current flap angles are not at the target flap angles, then control signal generator 342 generates actuator control signals to control the flap actuators 308 to move the flaps 310-312 to the target angles for those flaps, as indicated by block 398 in the flow diagram of FIG. 12. Processing reverts to block 394 where control signal generator 342 determines whether the current flap angles are at the target flap angles. Once the current flap angles reach the desired target flap angles, as indicated by block 396, then processing proceeds at block 400. If the harvesting operation is not yet complete, then processing again reverts to block 370 where the crop distribution detector 332 continues to detect the crop distribution across the cleaning subsystem 118.

It can thus be seen that the present system determines the crop distribution across the cleaning subsystem and controllably actuates flap actuators to move flaps that are disposed in the airflow paths generated by the cleaning fan so as to divert the airflow in a transverse, side-to-side direction relative to an elongate axis of the agricultural harvester. As a result, crop loss is reduced and crop quality increased during the harvesting operation.

Figure 13:
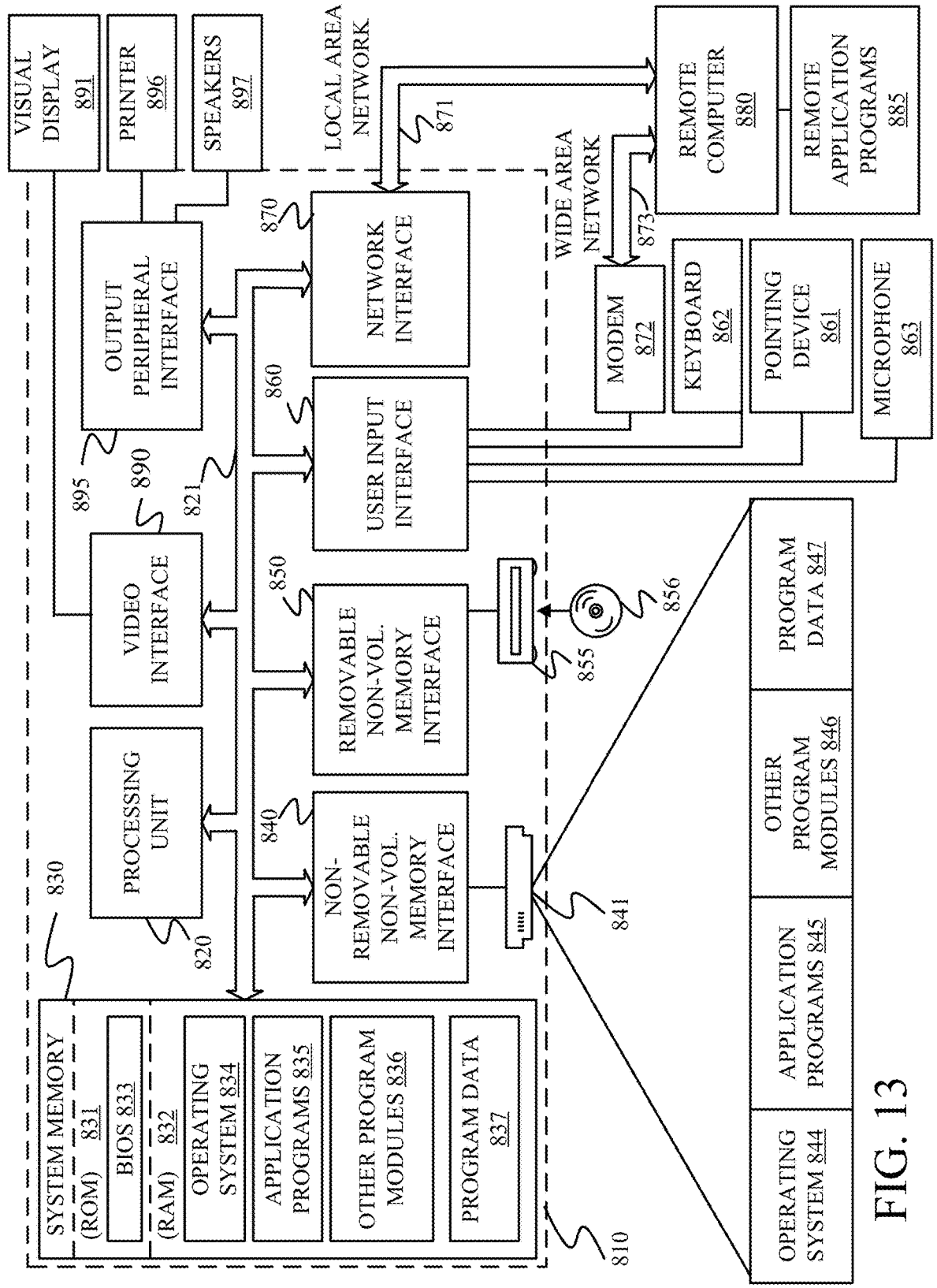
FIG. 13 is a block diagram showing one example of a computing environment.

FIG. 13 is one example of a computing environment in which elements of previous FIGS. can be deployed. With reference to FIG. 13, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 13.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features or methodological acts, it is to be understood that the subject matter defined in the appended claims is not necessarily limited to the specific features or acts described above. Rather, the specific features and acts described above are disclosed as example forms of the claims.

What is claimed is:

1. A cleaning subsystem of an agricultural harvester, the cleaning subsystem comprising:
   a sieve that separates material other than grain from grain in the agricultural harvester;
   a cleaning fan that generates air flow through an air duct, the air duct having an upper surface and a lower surface, the air duct defining an airflow path;
   a flap having a first end, a second end, and a height extending between the first end and the second end, the height extending along a majority of a distance between the upper surface of the air duct and the lower surface of the air duct, the flap being rotatable about an axis of rotation to redirect the airflow path;
   an actuator coupled to the flap and configured to control rotation of the flap about the axis of rotation;
   a crop distribution profile detector configured to determine a crop distribution across the sieve and generate a crop distribution signal indicative of the crop distribution;
   a flap angle processing system configured to:
     receive the crop distribution signal, and
     generate a target flap angle indicative of a target flap position of the flap about the axis of rotation based on the crop distribution signal; and
   a control signal generator configured to generate an actuator control signal to control the actuator to move the flap to the target flap position indicated by the target flap angle.

2. The cleaning subsystem of claim 1, wherein
   the flap comprises a first flap of a plurality of flaps, and
   each flap, of the plurality of flaps, has a respective first end, a respective second end, and a respective height extending between the respective first end and the respective second end, the respective height extending along a majority of a distance between the upper surface of the air duct and the lower surface of the air duct and being movable to laterally redirect a respective portion of the airflow path.

3. The cleaning subsystem of claim 2, wherein the first flap is independently controllable from one or more other flaps in the plurality of flaps.

4. The cleaning subsystem of claim 1 and further comprising:
a grain loss sensor configured to detect a variable indicative of grain loss in the cleaning subsystem and generate a grain loss sensor signal indicative of the grain loss, the control signal generator being configured to generate the actuator control signal based on the grain loss sensor signal.

5. The cleaning subsystem of claim 1 and further comprising:
a grain quality sensor configured to detect a variable indicative of grain quality and generate a grain quality sensor signal indicative of the grain quality, the control signal generator being configured to generate the actuator control signal based on the grain quality sensor signal.

6. The cleaning subsystem of claim 2, wherein
the air duct comprises a first lateral side and a second lateral side, and
the plurality of flaps are configured to concurrently extend along a majority of a width between the first lateral side and the second lateral side.

7. The cleaning subsystem of claim 2, wherein the actuator comprises:
a first actuator of a plurality of actuators, each actuator of the plurality of actuators controlling movement of at least one flap of the plurality of flaps.

8. The cleaning subsystem of claim 7, and further comprising:
a flap angle processing system configured to generate a first flap target angle corresponding to the first flap in the plurality of flaps, and a second flap target angle corresponding to a second flap in the plurality of flaps, the second flap target angle being different than the first flap target angle; and
a control signal generator configured to generate actuator control signals to control the first flap and the second flap based on the first flap target angle and the second flap target angle.

9. The cleaning subsystem of claim 1, wherein
the air duct comprises an upper air duct having the upper surface and the lower surface;
the airflow path comprises a first airflow path; and
the flap comprises a first flap movable to redirect the first airflow path of air from the upper air duct in a side-to-side transverse direction relative to an elongate axis of the agricultural harvester; and
further comprising:
a lower air duct having an upper surface and a lower surface, and
a second flap mounted to extend along a majority of a distance between the upper surface of the lower air duct and the lower surface of the lower air duct and being movable to redirect an airflow path of air from the lower air duct in a side-to-side transverse direction relative to an elongate axis of the agricultural harvester.

10. A computer implemented method of controlling an agricultural harvester, the computer implemented method comprising:
determining a crop distribution across a portion of a cleaning subsystem;
generating a crop distribution signal indicative of the crop distribution;
generating air flow with a cleaning fan that generates the air flow through an air duct, the air duct having an upper surface and a lower surface, the air duct defining an airflow path;
generating, based on the crop distribution signal, a target flap angle indicative of a target flap position of a flap about an axis of rotation, the flap having a first end, a second end, and a height extending between the first end and the second end, the height extending along a majority of a distance between the upper surface of the air duct and the lower surface of the air duct, the flap being movable to redirect the airflow path in a side-to-side transverse direction relative to an elongate axis of the agricultural harvester; and
generating an actuator control signal to control an actuator, coupled to the flap, to move the flap to the target flap position indicated by the target flap angle.

11. The computer implemented method of claim 10 and further comprising:
detecting a grain loss variable indicative of grain loss in the cleaning subsystem;
generating a grain loss sensor signal indicative of the grain loss variable;
detecting a grain quality variable indicative of grain quality; and
generating a grain quality sensor signal indicative of the grain quality variable, and
wherein generating the actuator control signal comprises generating the actuator control signal based on the grain loss sensor signal and the grain quality sensor signal.

12. The computer implemented method of claim 10, wherein the air duct comprises:
an upper air duct having an upper surface and a lower surface; and
a lower air duct having an upper surface and a lower surface,
wherein the flap comprises:
a first flap mounted to extend along a majority of a distance between the upper surface of the upper air duct and the lower surface of the upper air duct and being movable to redirect an airflow path of air from the upper air duct in a side-to-side transverse direction relative to an elongate axis of the agricultural harvester; and
a second flap mounted to extend along a majority of a distance between the upper surface of the lower air duct and the lower surface of the lower air duct and being movable to redirect an airflow path of air from the lower air duct in a side-to-side transverse direction relative to an elongate axis of the agricultural harvester, and
wherein controlling a position of a flap comprises:
controlling a position of the first flap and controlling a position of the second flap to redirect the airflow path in a side-to-side transverse direction relative to the elongate axis of the agricultural harvester based on the crop distribution.

13. A computer implemented method of controlling an agricultural harvester, the computer implemented method comprising:
determining a crop distribution across a portion of a cleaning subsystem;

generating a crop distribution signal indicative of the crop distribution;

generating, by a cleaning fan, air flow through an air duct, the air duct having an upper surface and a lower surface, the air duct defining an airflow path; and generating a first flap target angle corresponding to a first flap based on the crop distribution signal, wherein the first flap having a first end, a second end, and a height extending between the first end and the second end, the height extending along a majority of a distance between the upper surface of the air duct and the lower surface of the air duct, the first flap being movable to redirect the airflow path in a side-to-side transverse direction relative to an elongate axis of the agricultural harvester;

controlling a first actuator coupled to the first flap to move the first flap based on the first flap target angle;

generating a second flap target angle, different than the first flap target angle; corresponding to a second flap; and controlling a second actuator coupled to the second flap to move the second flap based on the second flap target angle.

\* \* \* \* \*